(12) United States Patent
Li et al.

(10) Patent No.: US 7,289,770 B2
(45) Date of Patent: Oct. 30, 2007

(54) COMPACT FEEDBACK FOR CLOSED LOOP MIMO

(75) Inventors: Qinghua Li, Sunnyvale, CA (US); Xintian E. Lin, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 515 days.

(21) Appl. No.: 10/952,505

(22) Filed: Sep. 28, 2004

(65) Prior Publication Data
US 2006/0068718 A1    Mar. 30, 2006

(51) Int. Cl.
*H04B 1/00*    (2006.01)
(52) U.S. Cl. ...................... 455/69; 455/562.1; 370/334

(58) Field of Classification Search ................. 455/69, 455/70, 562.1; 370/334
See application file for complete search history.

(56) References Cited

U.S. PATENT DOCUMENTS

| | | | |
|---|---|---|---|
| 6,847,805 B2 * | 1/2005 | Liu | 455/69 |
| 2004/0192218 A1 * | 9/2004 | Oprea | 455/73 |
| 2006/0071807 A1 * | 4/2006 | Sadowsky | 340/825.72 |

* cited by examiner

*Primary Examiner*—Lee Nguyen
(74) *Attorney, Agent, or Firm*—The Law Offices of John C. Scott, LLC; John C. Scott (57) ABSTRACT

Compact feedback schemes are presented for use in closed loop multiple input, multiple output systems.

56 Claims, 4 Drawing Sheets

COMPACT FEEDBACK FOR CLOSED LOOP MIMO

TECHNICAL FIELD

The invention relates generally to wireless communications and, more particularly, to multiple input multiple output (MIMO) based systems.

BACKGROUND OF THE INVENTION

Multiple input multiple output (MIMO) is a radio communication technique in which both a transmitter and a receiver use multiple antennas to wirelessly communicate with one another. By using multiple antennas at the transmitter and receiver, the spatial dimension may be taken advantage of in a manner that improves overall performance of the wireless link. MIMO may be performed as either an open loop or a closed loop technique. In open loop MIMO, a transmitter has no specific knowledge of the condition of the channel before signals are transmitted to a receiver. In closed loop MIMO, on the other hand, channel-related information is fed back from the receiver to the transmitter to allow the transmitter to precondition transmit signals before they are transmitted to better match the present channel state. The amount of feedback information that is delivered from a receiver to a transmitter in a system using closed loop MIMO can be very large. There is a general need for strategies to reduce the overall amount of feedback used in a closed loop MIMO system.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
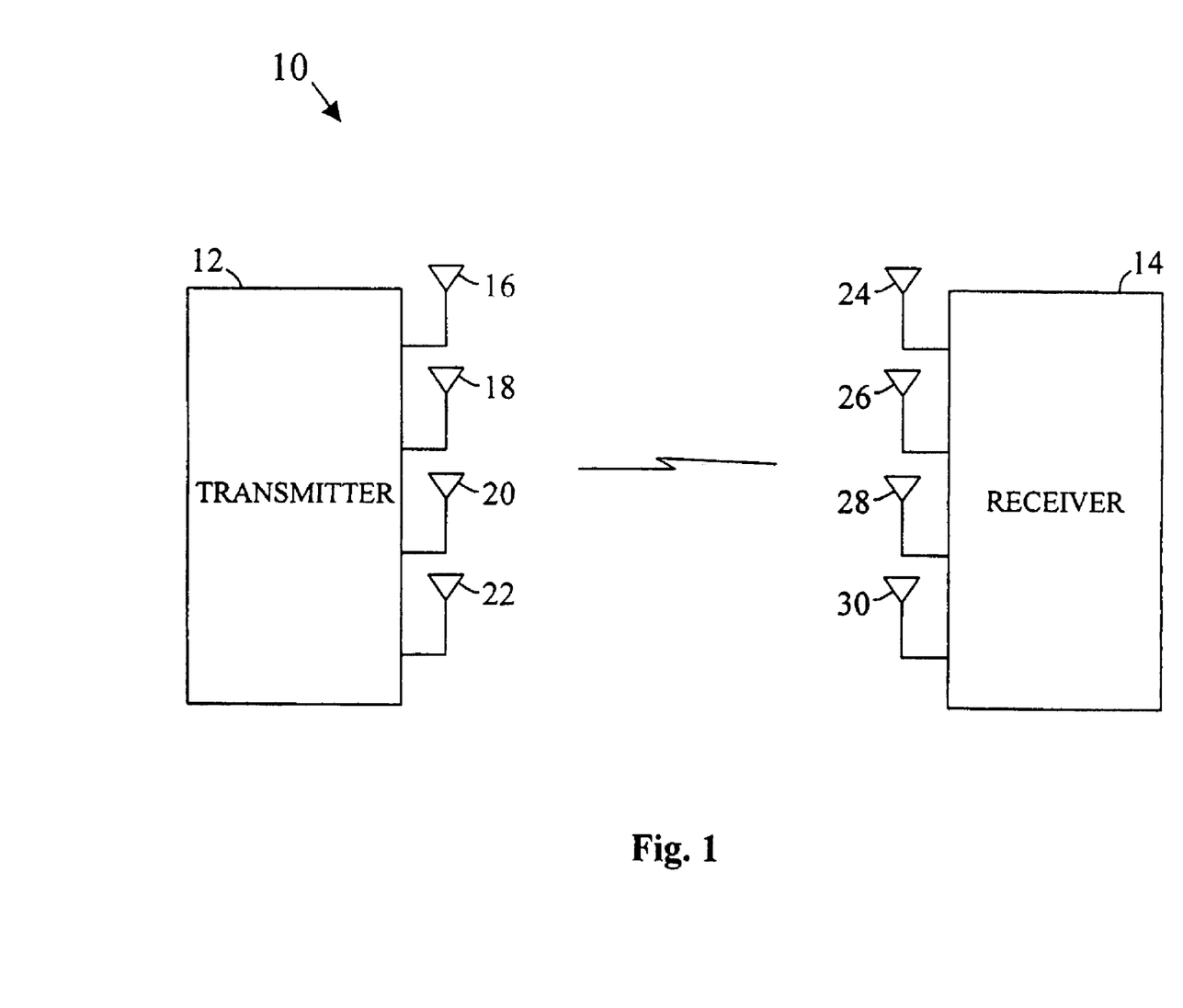
FIG. 1 is a block diagram illustrating an example wireless communication link in a MIMO-based wireless system in accordance with an embodiment of the present invention.

FIG. 1 is a block diagram illustrating an example wireless communication link 10 in a MIMO-based wireless system in accordance with an embodiment of the present invention. As illustrated, a wireless transmitter 12 is communicating with a wireless receiver 14 via a wireless channel. The transmitter 12 has four transmit antennas 16, 18, 20, 22 and the receiver 14 has four receive antennas 24, 26, 28, 30. The wireless channel is a multiple input, multiple output (MIMO) channel. Although illustrated with four transmit antennas 16, 18, 20, 22 and four receive antennas 24, 26, 28, 30 in FIG. 1, it should be appreciated that any number (i.e., greater than 1) of transmit antennas and any number (i.e., greater than 1) of receive antennas may be used to form a MIMO channel. The wireless link 10 of FIG. 1 may utilize "closed loop" MIMO techniques. That is, the receiver 14 may transmit channel-related feedback information to the transmitter 12 for use by the transmitter 12 in developing transmit signals. The same antennas may (or may not) be used for the reverse direction link that are used for the forward direction link. By utilizing knowledge of the channel, the transmitter 12 can tailor the transmit signals to the channel in a manner that simplifies receiver processing in and/or improves the performance of the receiver 14. The receiver 14 can generate the channel-related feedback information by, for example, appropriately processing training information received from the transmitter 12.

Various methods of developing channel-related feedback information are known in the art. One method of developing channel-related feedback information makes use of a mathematical technique known as singular value decomposition (SVD). When SVD is utilized in a MIMO-based system, the overall technique may be referred to as SVD-MIMO. In at least one embodiment, features of the present invention are implemented within a multicarrier communication system (although applications in single carrier systems also exist). One type of multicarrier technique that is gaining popularity is orthogonal frequency division multiplexing (OFDM). In a multicarrier system, a series of relatively narrow "subcarriers" may be used to transmit data across a wireless channel. To facilitate understanding and simplify notation, the discussion that follows may be with respect to a single subcarrier in a multicarrier system (e.g., an OFDM system). It should be appreciated, however, that the below described functions may be performed for each of the subcarriers within a multicarrier system. Interpolation between subcarriers may also be used to reduce the amount of calculation and feedback.

In a MIMO-based system, a wireless channel may be characterized using an $n_{RX} \times n_{TX}$ channel matrix H, where $n_{RX}$ is the number of receive antennas and $n_{TX}$ is the number of transmit antennas. Using SVD, the channel matrix H may be decomposed as follows:

$$H = UDV^H$$

where U and V are unitary matrices (i.e., matrices with orthonormal columns and unit amplitude), D is a diagonal matrix, and $V^H$ is the Hermitian of matrix V. A unitary matrix U has the following property:

$$U^H U = I$$

where I is the identity matrix. In the channel matrix decomposition set out above, the matrix V may be referred to as the beam forming matrix (precoder). This beam forming matrix V may be generated in the receiver 14 by first determining the channel matrix H (using, for example, received training information) and then decomposing the matrix H using SVD techniques (or other similar techniques). The beam forming matrix V may then be transmitted back to the transmitter 12 to be used in the generation of a subsequent transmit signal. A separate matrix V may be required for each subcarrier in a multicarrier system.

Figure 2:
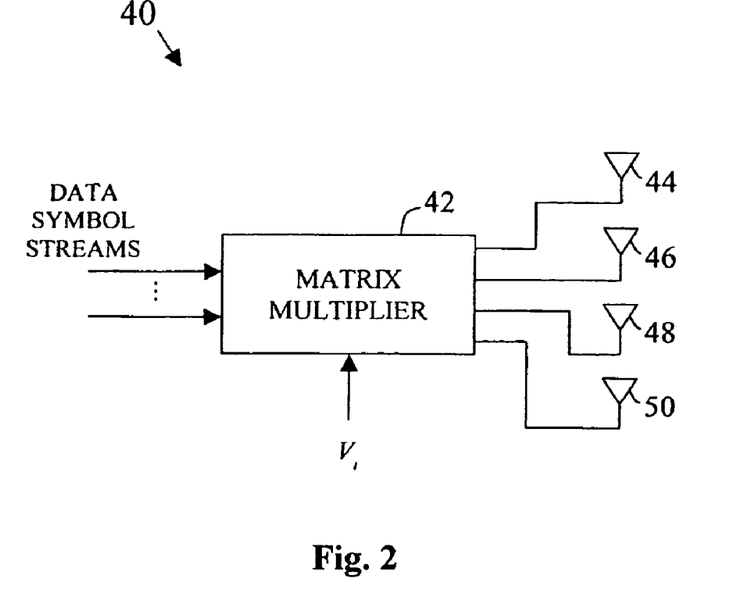
FIG. 2 is a block diagram illustrating the multiplication of data by a beam forming matrix (precoder) in a wireless transmitter in accordance with an embodiment of the present invention.

After receiving the beam forming matrix V from the receiver 14, the transmitter 12 may use the matrix to generate a subsequent transmit signal. For example, the transmitter 12 may multiply a vector X of complex symbols to be transmitted by the transmitter 12 by matrix V before transmission. FIG. 2 is a block diagram illustrating such a scenario. As shown, a matrix multiplier 42 receives a number of data symbol streams and a beam forming matrix $V_i$ at inputs thereof. The matrix multiplier 42 multiplies a vector of data symbols X by the beam forming matrix $V_i$ as follows:

$$Z = V_i X$$

where Z represents the symbols that will be transmitted. The outputs of the matrix multiplier 42 are directed to multiple transmit antennas. In the illustrated embodiment, four transmit antennas 44, 46, 48, 50 are used. Although not shown, additional processing functionality (e.g., an inverse discrete Fourier transform unit, a power amplifier, etc.) may be present between the matrix multiplier 42 and each corresponding transmit antenna 44, 46, 48, 50. After transmission, the transmitted symbols Z are acted upon by the channel H and are also subject to noise in the channel. Thus, the signal Y received by the receiver at the other side of the MIMO channel (e.g., receiver 14 in FIG. 1) may be represented as:

$$Y = HVX + N$$

where N is the additive noise. From the channel expression given above, it is found that:

$$HV = UDV^H V = UDI = UD$$

Therefore, Y may be expressed as:

$$Y = UDX + N$$

In the receiver, the received signal Y can be matrix multiplied by $U^H$ to achieve the following result:

$$U^H Y = U^H UDX + U^H N = IDX + U^H N = DX + U^H N$$

Thus, if the diagonal matrix D is known, the symbols X may be recovered. The above-described technique essentially diagonalizes the channel and allows the original symbols X to be recovered using relatively simple linear algebra techniques in the receiver. The elements of the diagonal matrix D are known as the singular values (or eigenvalues) of the channel matrix H. It should be appreciated that there are many other receiver techniques that may be used. For example, the receiver can use a minimum mean square error (MMSE) filter instead of multiplying by $U^H$, etc.

In a straightforward SVD implementation, a relatively large amount of feedback information is delivered from the receiver to the transmitter. That is, each complex element of the beam forming matrix V needs to be fed back for each subcarrier (in a multicarrier embodiment). As each complex element includes two real numbers (i.e., a modulus and an angle), the total number of real numbers to be fed back in a straightforward implementation for an n×n matrix is $2n^2$ for each subcarrier, where n is the number of spatial streams. In addition, each of these real numbers can be anywhere between $-\infty$ to $+\infty$. As will be appreciated, this large amount of feedback data can have a deleterious effect on overall system throughput. In one aspect of the present invention, techniques and structures are presented that are capable of significantly reducing the amount of data that needs to be fed back in a closed loop SVD MIMO channel to achieve an operative version of the beam forming matrix V within the transmitter. In at least one embodiment, a scheme for use with a 4×4 beam forming matrix is provided that only requires two sign bits, 9 "real number" parameters between 0 and 1, and 4 angles between $-\pi$ or and $+\pi$. This is only 13 total parameters (plus two sign bits) as opposed to 32 parameters (i.e., $2n^2 = 2 \times 4^2 = 32$) for the straightforward implementation. Other embodiments also exist.

Figure 3:
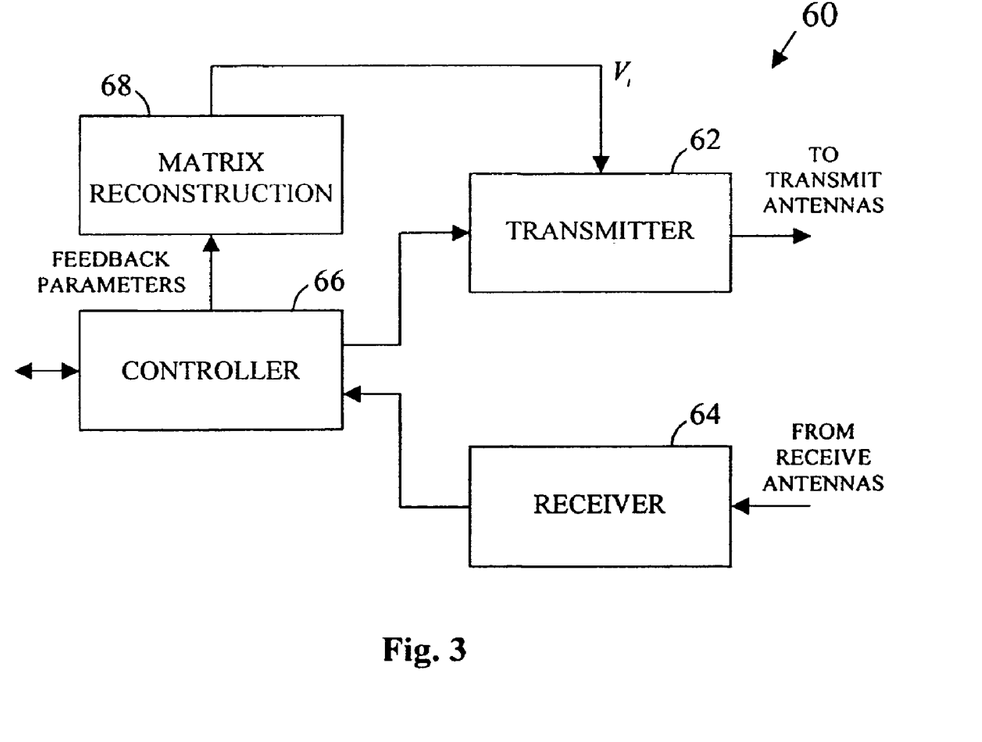
FIG. 3 is a block diagram illustrating an example communication device that may be used to transmit data to a remote receiver in accordance with an embodiment of the present invention.

FIG. 3 is a block diagram illustrating an example communication device 60 that may be used to transmit data to a remote receiver in accordance with an embodiment of the present invention. The communication device 60 is configured for use in a closed loop SVD MIMO based system. As illustrated, the communication device 60 includes: a wireless transmitter 62, a wireless receiver 64, a controller 66, and a matrix reconstruction unit 68. The transmitter 62 is operative for wirelessly transmitting data to the remote receiver via multiple transmit antennas. The transmitter 62 (or some other element) may include, among other things, a matrix multiplier to multiply data symbol vectors by a beam forming matrix V before transmission (e.g., see matrix multiplier 42 of FIG. 2). The wireless receiver 64 is operative for, among other things, receiving feedback information (via receive antennas) from the remote receiver that may be used in generating subsequent transmit signals within the communication device 60. The feedback information may include, for example, information describing a beam forming matrix to be used. In at least one embodiment of the present invention, the feedback information that is received by the wireless receiver 64 that describes the beam forming matrix is in a compact form (i.e., it is a reduced amount of data from the amount that would be transmitted in a straightforward SVD MIMO implementation). This compact feedback information may be used within the communication device 60 to reconstruct a corresponding beam forming matrix. In some embodiments, the feedback information may also include eigenvalue information for use in performing adaptive bit loading (ABL) within the communication device 60.

The controller 66 may control the operation of some or all of the elements within the communication device 60. When the controller 66 receives compact feedback information from the receiver 64, it may pass the information to the matrix reconstruction unit 68. The matrix reconstruction unit 68 may then reconstruct the corresponding beam forming matrix using the compact feedback information. In a multicarrier system, a reconstruction may be performed for each subcarrier. The matrix reconstruction unit 68 may then deliver the beam forming matrix (or matrices) to the transmitter 62 (or elsewhere) where it may be matrix multiplied with data symbols to be transmitted. The receive antennas coupled to the receiver 64 and the transmit antennas coupled to the transmitter 62 may be the same or different antennas.

Figure 4:
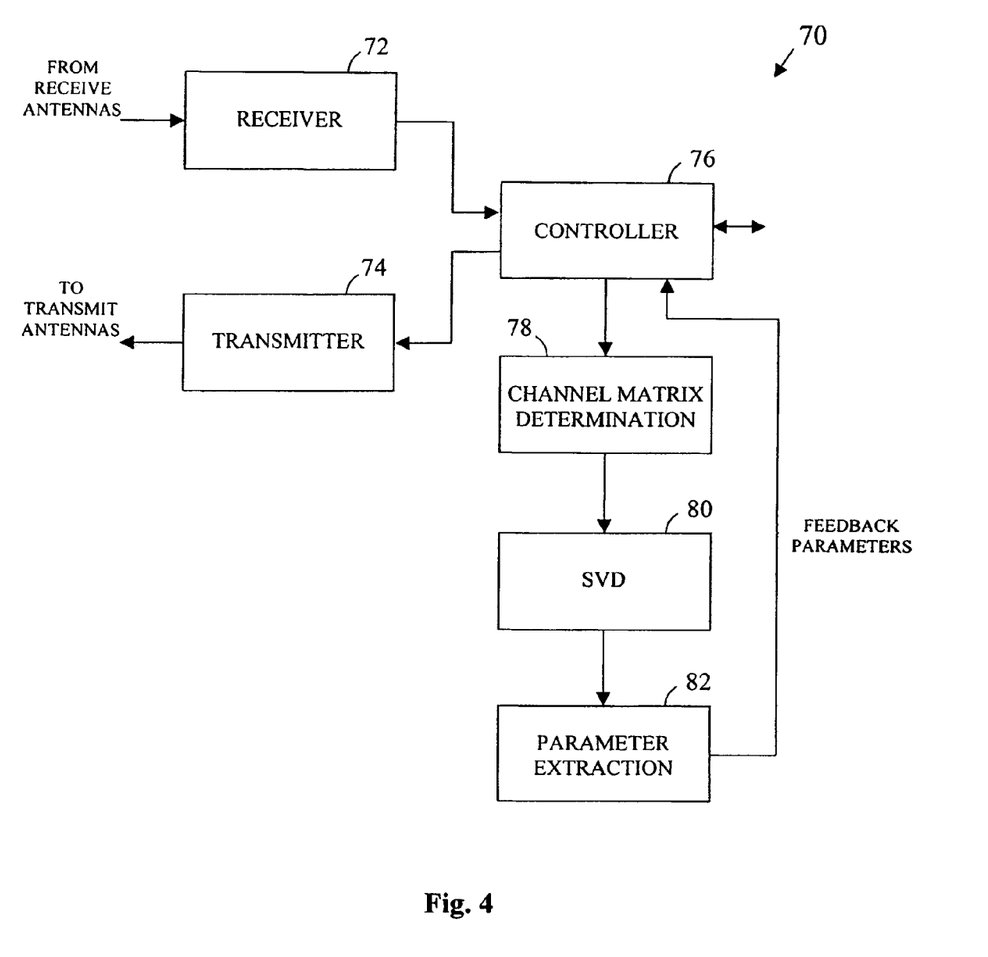
FIG. 4 is a block diagram illustrating an example communication device that may be used to receive data from a remote transmitter in accordance with an embodiment of the present invention.

FIG. 4 is a block diagram illustrating an example communication device 70 that may be used to receive data from a remote transmitter in accordance with an embodiment of the present invention. The communication device 70 is configured for use in a closed loop SVD MIMO type system. As illustrated, the communication device 70 includes: a wireless receiver 72, a wireless transmitter 74, a controller 76, a channel matrix determination unit 78, an SVD unit 80, and a parameter extraction unit 82. The wireless receiver 72 is operative for, among other things, receiving data from a remote transmitter via a MIMO channel. One type of data that may be received is training data that allows the communication device 70 to determine a channel matrix describing the MIMO channel. When the controller 76 detects training data, it may pass the training data to the channel matrix determination unit 78 which uses the data to determine the channel matrix. Techniques for determining a MIMO channel matrix using training data are well known in the art. The channel matrix determination unit 78 passes the channel matrix to the SVD unit 80 which decomposes the channel matrix using, for example, singular value decomposition techniques (or another similar technique). As part of the decomposition, the SVD unit 80 determines a beam forming matrix that is to be used by the remote transmitter to transmit data to the communication device 70 in a future data transmission operation. The SVD unit 80 passes the beam forming matrix to the parameter extraction unit 82 which extracts parameters from the beam forming matrix for delivery to the remote transmitter as feedback information. The parameters that are extracted from the beam forming matrix are intended to describe the beam forming matrix in a relatively compact form and may be used in the transmitter to reconstruct the beam forming matrix for use therein. The parameter extraction unit 82 may pass the extracted parameters to the controller 76 which may then deliver the parameters to the remote transmitter via local transmitter 74. In a multicarrier system, a set of parameters may be fed back for each subcarrier or interpolation may be used to reduce feedback overhead. Quantization techniques may be used to describe the parameters. As described above, in some embodiments, the information that is fed back to the remote transmitter may also include eigenvalue information for use in performing adaptive bit loading (ABL). Other types of information may also be fed back.

In the description that follows, a compact feedback solution is developed for use with a 4×4 beam forming matrix. The solution includes a determination of the type of information to be fed back to a transmitter from a receiver in an SVD MIMO link and techniques for reconstructing an associated beam forming matrix within the transmitter. After the 4×4 solution is presented, a more general solution is developed for the case of an n×n beam forming matrix.

Any complex, unit 4 vector may be expressed as follows:

$$v = \begin{bmatrix} v_1 \\ v_2 \\ v_3 \\ v_4 \end{bmatrix} = e^{i\theta_1} \begin{bmatrix} a_1 \\ a_2 e^{i\theta_2} \\ a_3 e^{i\theta_3} \\ \sqrt{1 - a_1^2 - a_2^2 - a_3^2}\, e^{i\theta_4} \end{bmatrix} \text{ where}$$

$$\|v\|^2 = \|v_1\|^2 + \|v_2\|^2 + \|v_3\|^2 + \|v_4\|^2 = 1;$$

$$a_1, a_2, a_3 \in [0, 1]; \text{ and}$$

$$\theta_1, \theta_2, \theta_3, \theta_4 \in [-\pi, \pi).$$

Similarly, any unitary 4×4 matrix, can be expressed as:

$$V = [\begin{array}{cccc} v_1 & v_2 & v_3 & v_4 \end{array}] = \lfloor e^{i\theta_{ij}} a_{ij} \rfloor$$

where $v'_j v_j = 1$ and $v'_j v_k = 0$ for $j,k = 1, 2, 3, 4$. The phases on the first row and the first column can be factored as:

$$V = \underbrace{\begin{bmatrix} 1 & 0 & 0 & 0 \\ 0 & e^{i\theta_{21}} & 0 & 0 \\ 0 & 0 & e^{i\theta_{31}} & 0 \\ 0 & 0 & 0 & e^{i\theta_{41}} \end{bmatrix}}_{P_L} \tilde{V} \underbrace{\begin{bmatrix} e^{i\theta_{11}} & 0 & 0 & 0 \\ 0 & e^{i\theta_{12}} & 0 & 0 \\ 0 & 0 & e^{i\theta_{13}} & 0 \\ 0 & 0 & 0 & e^{i\theta_{14}} \end{bmatrix}}_{P_R} \quad \text{[Equation 1]}$$

with matrix $\tilde{V}$ being expressed as follows:

$$\tilde{V} = \begin{bmatrix} a_{11} & a_{12} & a_{13} & \sqrt{1 - a_{11}^2 - a_{12}^2 - a_{13}^2} \\ a_{21} & e^{i\varphi_{22}} a_{22} & e^{i\varphi_{23}} a_{23} & e^{i\varphi_{24}} \sqrt{1 - a_{21}^2 - a_{22}^2 - a_{23}^2} \\ a_{31} & e^{i\varphi_{32}} a_{32} & e^{i\varphi_{33}} a_{33} & e^{i\varphi_{34}} \sqrt{1 - a_{31}^2 - a_{32}^2 - a_{33}^2} \\ \sqrt{1 - a_{11}^2 - a_{21}^2 - a_{31}^2} & e^{i\varphi_{42}} \sqrt{1 - a_{12}^2 - a_{22}^2 - a_{32}^2} & e^{i\varphi_{43}} \sqrt{1 - a_{13}^2 - a_{23}^2 - a_{33}^2} & e^{i\varphi_{44}} \sqrt{1 - a_{41}^2 - a_{42}^2 - a_{43}^2} \end{bmatrix} \quad \text{[Equation 2]}$$

where $\alpha_{jk} \in [0,1]$ and $\phi_{ij} = \theta_{ij} - \theta_{i1} - \theta_{1j}$. Since phase factorization does not change the unitary property, the matrix $\tilde{V}$ is still unitary. Although the phases of the first row and the first column are factored out in the above example, it should be appreciated that the phases associated with any row and column may be factored.

It can be shown that only $P_L$ and $\tilde{V}$ in Equation 1 above, and not $P_R$, need to be fed back to the transmitter to appropriately process a transmit signal therein. This is because matrix $P_R$ can be absorbed into D, the diagonal matrix in SVD, and may thus be taken care of in the training process. The angles $\theta_{21}$, $\theta_{31}$, and $\theta_{41}$ determine $P_L$ and the angles $\theta_{11}$, $\theta_{12}$, $\theta_{13}$, and $\theta_{14}$ determine $P_R$. It can also be shown that the matrix $\tilde{V}$, as set out in Equation 2 above, can be described by (and reconstructed from) only 9 parameters. However, there are many different 9 parameter combinations that may be used. Each of these combinations is a subset of all of the variables of $\tilde{V}$. Different combinations result in different complexities in the reconstruction of $\tilde{V}$ in the transmitter. In general, the complexity of extracting the parameters of $\tilde{V}$ is relatively low compared to the complexity of reconstructing $\tilde{V}$ based on these parameters. An example of the extraction process is set out below in Equation 3. In this example, the 9 extracted parameters are:

$$a_{11} = |\tilde{V}_{11}|, \quad a_{21} = |\tilde{V}_{21}|, \quad a_{31} = |\tilde{V}_{31}|$$

$$a_{12} = |\tilde{V}_{12}|, \quad a_{22} = |\tilde{V}_{22}|, \quad a_{32} = |\tilde{V}_{32}| \quad \text{[Equation 3]}$$

$$a_{13} = |\tilde{V}_{13}|, \quad a_{23} = |\tilde{V}_{23}|, \quad a_{33} = |\tilde{V}_{33}|$$

where |x| denotes the absolute value of x. Instead of sending parameters back directly, functions of the selected parameters may be sent. The functions may include, for example, common trigonometric functions such as arcsin(), arccos(), and arctan() or square(). Any design of a closed loop SVD MIMO feedback technique should address the dual goals of: 1) reducing the amount of data that needs to be fed back; and 2) achieving a low matrix reconstruction complexity in the transmitter.

In at least one embodiment of the present invention, the following parameters from the expression for $\tilde{V}$ in Equation 2 are included as feedback: $\alpha_{ij}$ (i=1,2,3 and j=1,2,3), $\phi_{22}$, and the signs of $\phi_{32}$ and $\phi_{33}$. The parameters $\alpha_{ij}$ (i=1,2,3 and j=1,2,3) and $\phi_{22}$ may be quantized before they are fed back. In addition, the angles $\theta_{21}$, $\theta_{31}$, and $\theta_{41}$ from $P_L$ may also be fed back. These parameters may also be quantized before they are fed back. As will be described in greater detail, the reconstruction of $\tilde{V}$ in the transmitter (e.g., within the matrix reconstruction unit 68 of FIG. 3) may then be carried out in the following manner: (1) compute the unknown $\alpha_{ij}$ based on the unit vector condition; (2) compute $\phi_{32}$ and $\phi_{42}$ to reconstruct the second column $\tilde{v}_2$ of $\tilde{V}$; (3) compute the third column $\tilde{v}_3$ of $\tilde{V}$ based on the unitary property of $\tilde{V}$; and (4) compute the fourth column $\tilde{v}_4$ of $\tilde{V}$ based on the row orthogonality of $\tilde{V}$. The matrix $\tilde{V}$ may be rewritten as follows:

$$\tilde{V} = \begin{bmatrix} a_{11} & a_{12} & a_{13} & a_{14} \\ a_{21} & e^{i\varphi_{22}}a_{22} & e^{i\varphi_{23}}a_{23} & e^{i\varphi_{24}}a_{24} \\ a_{31} & e^{i\varphi_{32}}a_{32} & e^{i\varphi_{33}}a_{33} & e^{i\varphi_{34}}a_{34} \\ a_{41} & e^{i\varphi_{42}}a_{42} & e^{i\varphi_{43}}a_{43} & e^{i\varphi_{44}}a_{44} \end{bmatrix} \quad \text{[Equation 4]}$$

To compute the remaining $\alpha_{ij}$, using the fed back $\alpha_{ij}$, the following equations may be used:

$$\alpha_{14} = \sqrt{1 - \alpha_{11}^2 - \alpha_{12}^2 - \alpha_{13}^2}$$

$$\alpha_{24} = \sqrt{1 - \alpha_{21}^2 - \alpha_{22}^2 - \alpha_{23}^2}$$

$$\alpha_{34} = \sqrt{1 - \alpha_{31}^2 - \alpha_{32}^2 - \alpha_{33}^2}$$

$$\alpha_{41} = \sqrt{1 - \alpha_{11}^2 - \alpha_{21}^2 - \alpha_{31}^2}$$

$$\alpha_{42} = \sqrt{1 - \alpha_{12}^2 - \alpha_{22}^2 - \alpha_{32}^2}$$

$$\alpha_{43} = \sqrt{1 - \alpha_{13}^2 - \alpha_{23}^2 - \alpha_{33}^2}$$

$$\alpha_{44} = \sqrt{1 - \alpha_{14}^2 - \alpha_{24}^2 - \alpha_{34}^2}$$

Since $\tilde{v}_2$ is orthogonal to $\tilde{v}_1$, it follows that $v_1'v_2=0$. This relationship can be expressed as:

$$c_1 + c_2 e^{i\phi_{32}} + c_3 e^{i\phi_{42}} = 0 \quad \text{[Equation 5]}$$

where:

$$c_1 = \alpha_{11}\alpha_{12} + \alpha_{21}\alpha_{22}e^{i\phi_{22}} = \|c_1\|e^{i\alpha_1}$$

$$c_2 = \alpha_{31}\alpha_{32}$$

$$c_3 = \alpha_{41}\alpha_{42} \quad \text{[Equation 6]}$$

Figure 5:
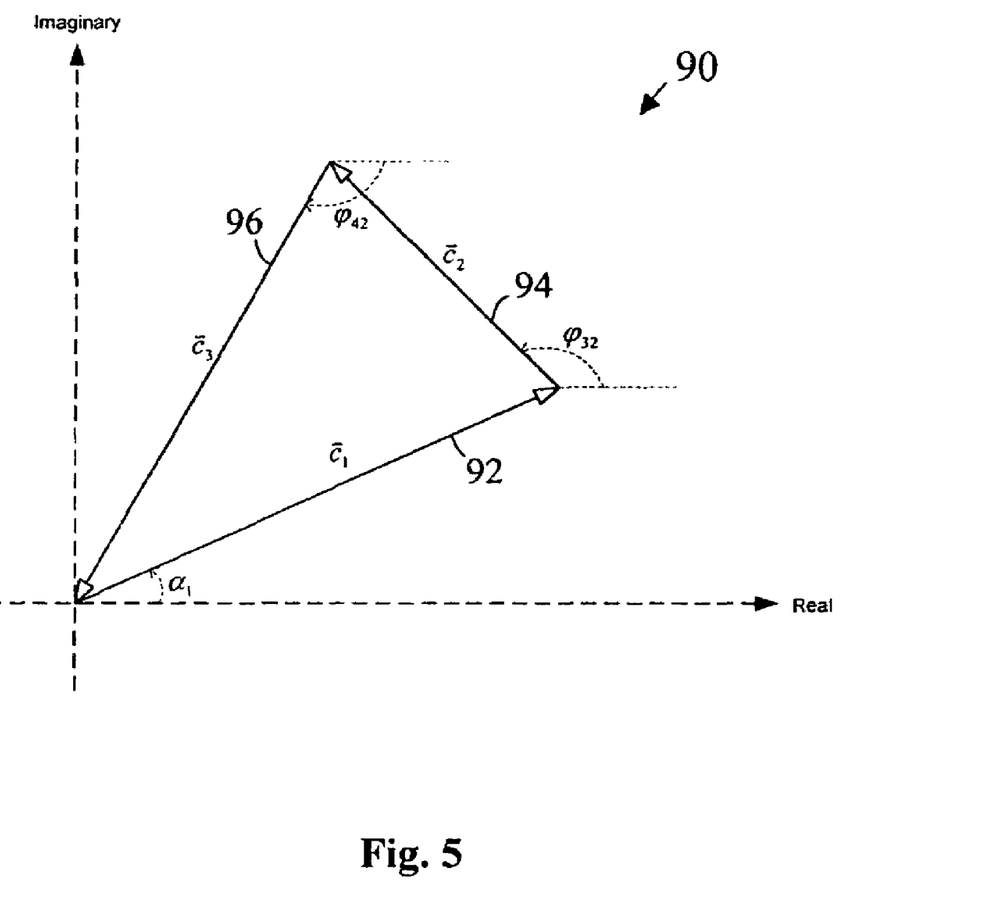
FIG. 5 is a graph illustrating a geometric relationship that may be used during beam steering matrix reconstruction in a transmitter in accordance with an embodiment of the present invention.

FIG. 5 is a graph illustrating a geometric relationship 90 that is representative of Equation 5 above. In FIG. 5, $\alpha_1$ is the angle of vector $\vec{c}_1$ 92, $\phi_{32}$ is the angle of vector $\vec{c}_2$ 94, and $\phi_{42}$ is the angle of vector $\vec{c}_3$ 96. The values of $c_2$ and $c_3$ are greater than or equal to zero. Using trigonometry, the solutions for $\phi_{32}$ and $\phi_{42}$ may be calculated as follows:

$$\varphi_{32} = \text{sign}(\angle \vec{c}_1 \vec{c}_2) \left[ \pi - \arccos\left( \frac{\|c_1\|^2 + c_2^2 - c_3^2}{2\|c_1\|c_2} \right) \right] + \alpha_1$$

$$\varphi_{42} = \text{sign}(\angle \vec{c}_1 \vec{c}_2) \left[ \arccos\left( \frac{\|c_1\|^2 + c_3^2 - c_2^2}{2\|c_1\|c_3} \right) - \pi \right] + \alpha_1$$

where $\angle \vec{x}\,\vec{y}$ is the angle formed by vectors $\vec{x}$ and $\vec{y}$ in the direction from $\vec{x}$ to $\vec{y}$ and $\text{sign}(\angle \vec{x}\,\vec{y})$ is the sign of $\angle \vec{x}\,\vec{y}$. The parameter $\angle \vec{x}\,\vec{y}$ is positive (i.e., $\text{sign}(\angle \vec{x}\,\vec{y})=1$) if $\angle \vec{x}\,\vec{y}$ is counterclockwise in $[0, \pi]$. Similarly, the parameter $\angle \vec{x}\,\vec{y}$ is a negative (i.e., $\text{sign}(\angle \vec{x}\,\vec{y})=-1$) if $\angle \vec{x}\,\vec{y}$ is clockwise in $[0, \pi)$.

To solve for the third column $\tilde{v}_3$ of $\tilde{V}$, the following procedure may be followed. Since $\tilde{v}_3$ is orthogonal to $\tilde{v}_1$ and $\tilde{v}_2$, it follows that $v_1'v_3=0$ and $v_2'v_3=0$. These relationships may be expressed as follows:

$$a_1 + a_2 e^{i\phi_{23}} + a_3 e^{i\phi_{33}} + a_4 e^{i\phi_{43}} = 0 \quad \text{[Equation 7]}$$

$$b_1 + b_2 e^{i\phi_{23}} + b_3 e^{i\phi_{33}} + b_4 e^{i\phi_{43}} = 0 \quad \text{[Equation 8]}$$

where:

$$a_1 = \alpha_{11}\alpha_{13}$$

$$a_2 = \alpha_{21}\alpha_{23}$$

$$a_3 = \alpha_{31}\alpha_{33}$$

$$a_4 = \alpha_{41}\alpha_{43}$$

$$b_1 = \alpha_{12}\alpha_{13}$$

$$b_2 = \alpha_{22}\alpha_{23}\,e^{-i\phi_{22}}$$

$b_3 = \alpha_{32}\alpha_{33} e^{-i\phi_{32}}$ $b_4 = \alpha_{42}\alpha_{43} e^{-i\phi_{42}}$ Elimination of $e^{i\phi_{23}}$ using Equations 7 and 8 results in:

$$d_1 + d_2 e^{i\phi_{33}} + d_3 e^{i\phi_{43}} = 0 \qquad \text{[Equation 9]}$$

where:

$d_1 = \alpha_1 b_2 - \alpha_2 b_1$ $d_2 = \alpha_3 b_2 - \alpha_2 b_3$ $d_3 = \alpha_4 b_2 - \alpha_2 b_4$ Equation 9 may be solved in a manner similar to Equation 5 discussed previously, using trigonometric relationships. This results in:

$$\varphi_{33} = \text{sign}(\angle \vec{d}_1 \vec{d}_2)\left[\pi - \arccos\left(\frac{d_1^2 + d_2^2 - d_3^2}{2 d_1 d_2}\right)\right] \qquad \text{[Equation 10]}$$

$$\varphi_{43} = \text{sign}(\angle \vec{d}_1 \vec{d}_2)\left[\arccos\left(\frac{d_1^2 + d_3^2 - d_2^2}{2 d_1 d_3}\right) - \pi\right]$$

Substitution of Equation 10 into Equation 7 results in the following solution for $\phi_{23}$:

$\phi_{23} = -\text{angle}(\alpha_1 + \alpha_3 e^{i\phi_{33}} + \alpha_4 e^{i\phi_{43}})$ Because $\tilde{V}$ is unitary, the second row of $\tilde{V}$ is orthogonal to the first row. This leads to the following solution for $e^{i\phi_{24}}$:

$$e^{i\varphi_{24}} = \frac{-a_{11}a_{21} - \sum_{j=2}^{3} a_{1j} a_{2j} e^{i\varphi_{2j}}}{a_{14} a_{24}}$$

Similarly, $e^{i\phi_{34}}$ and $e^{i\phi_{44}}$ may be expressed as:

$$e^{i\varphi_{34}} = \frac{-a_{11}a_{31} - \sum_{j=2}^{3} a_{1j} a_{3j} e^{i\varphi_{3j}}}{a_{14} a_{34}}$$

$$e^{i\varphi_{44}} = \frac{-a_{11}a_{41} - \sum_{j=2}^{3} a_{1j} a_{4j} e^{i\varphi_{4j}}}{a_{14} a_{44}}$$

Thus, with reference to Equation 4 above, values for $\alpha_{11}$, $\alpha_{12}$, $\alpha_{13}$, $\alpha_{21}$, $\alpha_{22}$, $\alpha_{23}$, $\alpha_{31}$, $\alpha_{32}$, $\alpha_{33}$, and $\phi_{22}$, along with the signs of $\phi_{32}$ and $\phi_{33}$, may be delivered from a receiver to a transmitter and values for $\alpha_{14}$, $\alpha_{24}$, $\alpha_{34}$, $\alpha_{41}$, $\alpha_{42}$, $\alpha_{43}$, $\alpha_{44}$, $\phi_{23}$, $\phi_{32}$, $\phi_{33}$, $\phi_{42}$, $\phi_{43}$, $e^{i\phi_{24}}$, $e^{i\phi_{34}}$, $e^{i\phi_{44}}$ may be generated within the transmitter to reconstruct the matrix $\tilde{V}$ using the above approach. This may be performed, for example, within the matrix reconstruction unit 48 of FIG. 3. As described previously, in addition to the parameters listed above, the parameters $\theta_{21}$, $\theta_{31}$, and $\theta_{41}$ may also be fed back to the transmitter to permit reconstruction of matrix $P_L$ (within, for example, matrix reconstruction unit 48). The matrices $P_L$ and $\tilde{V}$ may then be used to generate a subsequent transmit signal (e.g., $Z = P_L \tilde{V} X$). As mentioned previously, the matrix $P_R$ is not needed to achieve the desired result. Thus, feedback including 13 parameters and two sign bits allow the 4×4 beam forming matrix to be reconstructed in the transmitter in a relatively low complexity manner.

For a more general n×n beam forming matrix, a similar solution approach may be taken. Any complex, unit n vector may be expressed as follows:

$$v = \begin{bmatrix} v_1 \\ v_2 \\ \vdots \\ v_n \end{bmatrix} = \begin{bmatrix} a_1 e^{i\theta_1} \\ \vdots \\ a_{n-1} e^{i\theta_{n-1}} \\ \sqrt{1 - \sum_{j=1}^{n-1} a_j^2} e^{i\theta_{n-1}} \end{bmatrix}$$

where $\|v\|^2 = \sum_{j=1}^{n} \|v_j\|^2 = 1$; $a_j \in [0, 1]$; and $\theta_j \in [-\pi, \pi)$ for $j = 1, \ldots, n$.

Similarly, any unitary n×n matrix, can be expressed as:

$$V = \begin{bmatrix} v_1 & v_2 & \ldots & v_n \end{bmatrix} = \lfloor e^{i\theta_{j,k}} a_{j,k} \rfloor$$

where $v'_j v_j = 1$ and $v'_j v_k = 0$ for $j,k = 1, \ldots, n$. The phases on the first row and the first column (or any other row and column) can be factored as:

$$V = \begin{bmatrix} 1 & & & \\ & e^{i\theta_{2,1}} & & \\ & & \ddots & \\ & & & e^{i\theta_{n,1}} \end{bmatrix}_{P_L} \tilde{V} \begin{bmatrix} e^{i\theta_{1,1}} & & & \\ & e^{i\theta_{1,2}} & & \\ & & \ddots & \\ & & & e^{i\theta_{1,n}} \end{bmatrix}_{P_R} \qquad \text{[Equation 11]}$$

with matrix $\tilde{V}$ being expressed as follows:

$$\tilde{V} = \begin{bmatrix} a_{1,1} & a_{1,2} & \cdots & a_{1,n-1} & \sqrt{1 - \sum_{j=1}^{n-1} a_{1,j}^2} \\ a_{2,1} & e^{i\varphi_{2,2}} a_{2,2} & \cdots & e^{i\varphi_{2,n-1}} a_{2,n-1} & e^{i\varphi_{2,n}} \sqrt{1 - \sum_{j=1}^{n-1} a_{j,n-1}^2} \\ \vdots & \vdots & \vdots & \vdots & \vdots \\ a_{n-1,1} & e^{i\varphi_{n-1,2}} a_{n-1,2} & \cdots & e^{i\varphi_{n-1,2}} a_{n-1,2} & e^{i\varphi_{n-1,n}} \sqrt{1 - \sum_{j=1}^{n-1} a_{n-1,j}^2} \\ \sqrt{1 - \sum_{j=1}^{n-1} a_{j,1}^2} & e^{i\varphi_{n,2}} \sqrt{1 - \sum_{j=1}^{n-1} a_{j,2}^2} & \cdots & e^{i\varphi_{n,n-1}} \sqrt{1 - \sum_{j=1}^{n-1} a_{j,n-1}^2} & e^{i\varphi_{n,n}} \sqrt{\sum_{j=1}^{n-1} \sum_{k=1}^{n-1} a_{j,k}^2 - n + 1} \end{bmatrix}$$

[Equation 12]

where $\alpha_{j,k} \in [0,1]$ for $j,k=1, \ldots, n-1$ and $\phi_{j,k} \in (-\pi,\pi]$ for $j,k=2, \ldots, n$. Since phase factorization does not change the unitary property, the matrix $\tilde{V}$ is still unitary.

As before, only $P_L$ and $\tilde{V}$ in Equation 11 above, and not $P_R$, need to be fed back to the transmitter to appropriately process a transmit signal therein. The angles $\theta_{j,l}$, $j=2, \ldots, n$ determine $P_L$ and the angles $\theta_{l,k}$, $k=1, \ldots, n$ determine $P_R$. The unitary matrix $\tilde{V}$, as set out in Equation 12 above, can be described by (and reconstructed from) only $(n-1)^2$ parameters (e.g., $\alpha_{j,k}$, $j,k=1, \ldots, n-1$). This can be proven as follows. First, assume that the $(n-1)^2$ parameters are $\alpha_{j,k}$, $j,k=1, \ldots, n-1$. These are the magnitudes of elements in the upper, left sub-matrix of $\tilde{V}$ in Equation 12. The magnitudes at the last row and column of $\tilde{V}$ (i.e., $\alpha_{n,k}$, $\alpha_{j,n}$, $j=1 \ldots n$, $k=1 \ldots n$) can be solved using a unitary property of $\tilde{V}$ (i.e., that all rows and columns have unit norms). The magnitudes may be solved as:

$$a_{n,k} = \sqrt{1 - \sum_{j=1}^{n-1} a_{j,k}^2} \quad k=1, \cdots, n$$

$$a_{j,n} = \sqrt{1 - \sum_{k=1}^{n-1} a_{j,n}^2} \quad j=1, \cdots, n-1$$

The remaining unknown variables are the $(n-1)^2$ angles, $\phi_{j,k}$, $j,k=2, \ldots, n$. These angles are the phases of each element of $\tilde{V}$, excluding the first row and column. First, the angles in column 2 through column $n-1$ may be determined (i.e., $\phi_{j,k}$, $j=2, \ldots, n$, $k=2, \ldots, n-1$). There are $(n-1)(n-2)$ unknown angles in these columns. Since $\tilde{V}$ is unitary, any two columns between column 1 and column $n-1$ are orthogonal to each other. Using these constraints, the following $(n-1)(n-2)$ equations may be obtained:

$$\tilde{v}_k' \tilde{v}_j = 0, \quad k=1, \ldots, n-2, k<j<=n-1 \text{ or}$$

[Equation 13]

$$\text{Re}\{a_{1,j} a_{1,k} + a_{2,j} a_{2,k} e^{i(\varphi_{2,j} - \varphi_{2,k})} + \ldots + a_{n,j} a_{n,k} e^{i(\varphi_{n,j} - \varphi_{n,k})}\} = 0$$

$$\text{Im}\{a_{1,j} a_{1,k} + a_{2,j} a_{2,k} e^{i(\varphi_{2,j} - \varphi_{2,k})} + \ldots + a_{n,j} a_{n,k} e^{i(\varphi_{n,j} - \varphi_{n,k})}\} = 0 \text{ where}$$

$$k = 1, \ldots, n-2, k < j <= n-1.$$

These equations are non-linear and uniquely determine the $(n-1)(n-2)$ angles therein. The equations may be solved using, for example, numerical methods (e.g., Newton and Newton-Seidel algorithms may be employed). Because $\tilde{V}$ is unitary, the first row of $\tilde{V}$ is orthogonal to the other rows. Thus, the angles in the last column (i.e., the only remaining unsolved variables) may be determined as follows:

$$\varphi_{j,n} = \text{angle}\left(\frac{-1}{a_{1,n} a_{j,n}} \sum_{k=1}^{n-1} a_{1,k} a_{j,k} e^{i\varphi_{j,k}}\right), j=2, \cdots, n$$

There are many different combinations of $(n-1)^2$ parameters that may be used to describe the unitary matrix $\tilde{V}$. Each of these combinations is a subset of all of the variables of $\tilde{V}$ set out in Equation 12 above. For example, the angle $\phi_{j,k}$ and the magnitude $\tilde{v}_{j,k}$ are equivalent (i.e., if $\phi_{j,k}$ is a specified parameter, then $\tilde{v}_{j,k}$ is determined by solving Equation 13 above). As in the 4×4 solution described previously, different combinations will typically result in different reconstruction complexities in the transmitter. Again, the complexity of extracting the parameters of $\tilde{V}$ will typically be relatively low compared to the complexity of reconstructing $\tilde{V}$ based on these parameters. An example of the extraction process for an n×n implementation follows:

$$\alpha_{j,k} = |\tilde{V}_{j,k}|, j=1, \ldots, n-1, k=1, \ldots, n-1$$

Thus, in at least embodiment of the present invention, $(n-1)^2$ parameters may be fed back from a receiver to a transmitter in an SVD MIMO system and then used in the transmitter to reconstruct an n×n matrix $\tilde{V}$. In addition, n−1 angle parameters may also be fed back to reconstruct matrix $P_L$ in the transmitter. The matrices $P_L$ and $\tilde{V}$ may then be used to generate a subsequent transmit signal (e.g., $Z=P_L$ $\tilde{V}X$). Therefore, feedback including $n^2-n$ parameters allows the $n \times n$ beam forming matrix to be reconstructed in the transmitter in a relatively low complexity manner.

As described previously, in addition to information describing the beam forming matrix, the feedback from the receiver to the transmitter may also include eigenvalue information for use in performing adaptive bit loading (ABL) within the transmitter. For example, in at least embodiment, the feedback information in an $n \times n$ system may include $n^2-n$ parameters to describe the beam forming matrix and n real parameters to describe the eigenvalues in the matrix D.

The techniques and structures of the present invention may be implemented in any of a variety of different forms. For example, features of the invention may be embodied within cellular telephones and other handheld wireless communicators, personal digital assistants having wireless capability, laptop, palmtop, and tablet computers having wireless capability, pagers, satellite communicators, cameras having wireless capability, audio/video devices having wireless capability, network interface cards (NICs) and other network interface structures, integrated circuits, as instructions and/or data structures stored on machine readable media, and/or in other formats. Examples of different types of machine readable media that may be used include floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. In at least one form, the invention is embodied as a set of instructions that are modulated onto a carrier wave for transmission over a transmission medium.

It should be appreciated that the individual blocks illustrated in the block diagrams herein may be functional in nature and do not necessarily correspond to discrete hardware elements. For example, in at least one implementation, two or more of the blocks in a block diagram may be realized within a single digital processing devices. For example, controller 66 and matrix reconstruction unit 68 of FIG. 3 may be implemented in a common digital processing device (although separate processing devices may alternatively be used). The digital processing device may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A wireless communication device comprising:
a matrix multiplier to multiply a data symbol vector by a beam forming matrix before said data symbol vector is transmitted to a remote wireless entity via multiple transmit antennas;
a receiver to receive feedback information from the remote wireless entity, said feedback information describing, in a compact form, a specific beam forming matrix to be used in a future data transmission to said remote wireless entity; and
a matrix reconstruction unit to reconstruct said specific beam forming matrix using said feedback information, said reconstructed beam forming matrix for delivery to said matrix multiplier;
wherein said specific beam forming matrix is an $n \times n$ matrix and said feedback information includes no more than $n^2-n+1$ real variables and $n-2$ sign bits to describe said specific beam forming matrix.

2. The wireless communication device of claim 1, wherein:
said specific beam forming matrix is a $4 \times 4$ matrix; and
said feedback information includes no more than 13 real variables and 2 sign bits to describe said specific beam forming matrix.

3. The wireless communication device of claim 1, wherein:
said specific beam forming matrix is a $4 \times 4$ matrix; and
said feedback information consists of two sign bits, 9 real numbers between 0 and 1, and 4 angles between $-\pi$ and $+\pi$ to describe said specific beam forming matrix.

4. The wireless communication device of claim 1, wherein:
said feedback information includes no more than $n^2-n$ parameters to describe said specific beam forming matrix.

5. The wireless communication device of claim 4, wherein:
said feedback information further includes n parameters to describe eigenvalues for use in performing adaptive bit loading.

6. The wireless communication device of claim 1, wherein:
said specific beam forming matrix is an $n \times n$ matrix; and
said feedback information consists of $n^2-2n+1$ real numbers between 0 and 1 and $n-1$ angles between $-\pi$ and $+\pi$ to describe said specific beam forming matrix.

7. The wireless communication device of claim 1, wherein:
said specific beam forming matrix can be expressed as a product of two matrices, $P_L$ and $\tilde{V}$; and
said matrix reconstruction unit is programmed to reconstruct matrix $\tilde{V}$ and matrix $P_L$ using said feedback information;
wherein said specific beam forming matrix is derived from an original beam forming matrix $$V = \begin{bmatrix} v_1 & v_2 & \ldots & v_n \end{bmatrix} = \lfloor e^{i\theta_{j,k}} a_{j,k} \rfloor$$

that is factored as follows:

$$V = P_L \tilde{V} P_R$$

where matrix $P_L$ has the form:

$$P_L = \begin{bmatrix} 1 & & & \\ & e^{i\theta_{2,1}} & & \\ & & \ddots & \\ & & & e^{i\theta_{n,1}} \end{bmatrix}$$

and matrix $\tilde{V}$ has the form:

$$\tilde{V} = \begin{bmatrix} a_{1,1} & a_{1,2} & \cdots & a_{1,n-1} & \sqrt{1 - \sum_{j=1}^{n-1} a_{1,j}^2} \\ a_{2,1} & e^{i\varphi_{2,2}} a_{2,2} & \cdots & e^{i\varphi_{2,n-1}} a_{2,n-1} & e^{i\varphi_{2,n}} \sqrt{1 - \sum_{j=1}^{n-1} a_{j,n-1}^2} \\ \vdots & \vdots & \vdots & \vdots & \vdots \\ a_{n-1,1} & e^{i\varphi_{n-1,2}} a_{n-1,2} & \cdots & e^{i\varphi_{n-1,2}} a_{n-1,2} & e^{i\varphi_{n-1,n}} \sqrt{1 - \sum_{j=1}^{n-1} a_{n-1,j}^2} \\ \sqrt{1 - \sum_{j=1}^{n-1} a_{j,1}^2} & e^{i\varphi_{n,2}} \sqrt{1 - \sum_{j=1}^{n-1} a_{j,1}^2} & \cdots & e^{i\varphi_{n,n-1}} \sqrt{1 - \sum_{j=1}^{n-1} a_{j,n-1}^2} & e^{i\varphi_{n,n}} \sqrt{\sum_{j=1}^{n-1} \sum_{k=1}^{n-1} a_{j,k}^2 - n + 1} \end{bmatrix}.$$

8. The wireless communication device of claim 7, wherein:

said matrix $\tilde{V}$ is a 4×4 matrix having 16 complex elements, each complex element having a modulus and an angle, wherein 9 of said moduli are included in said feedback information; and said matrix reconstruction unit is programmed to calculate the other 7 moduli of matrix $\tilde{V}$ using the 9 moduli in said feedback information, based on the unit vector condition.

9. The wireless communication device of claim 8, wherein:

said matrix reconstruction unit is programmed to calculate angles for complex elements in a second column of matrix $\tilde{V}$ based on orthogonality between said second column and a first column of matrix $\tilde{V}$, wherein an angle associated with one complex element of said second column is included within said feedback information.

10. The wireless communication device of claim 9, wherein:

said matrix reconstruction unit is programmed to use trigonometric relationships to calculate said angles for said complex elements in said second column.

11. The wireless communication device of claim 9, wherein:

all complex elements within said first column of matrix $\tilde{V}$ have angles of zero.

12. The wireless communication device of claim 9, wherein:

said matrix reconstruction unit is programmed to calculate angles for complex elements in a third column of matrix $\tilde{V}$ based on orthogonality between said third column and said first and second columns, wherein said matrix reconstruction unit is programmed to use trigonometric relationships to calculate said angles for said complex elements in said third column.

13. The wireless communication device of claim 12, wherein:

said matrix reconstruction unit is programmed to calculate angle terms for complex elements in a fourth column of matrix $\tilde{V}$ based on orthogonality between rows within matrix $\tilde{V}$.

14. The wireless communication device of claim 13, wherein:

said first, second, third, and fourth columns of matrix $\tilde{V}$ are not in numerical order.

15. The wireless communication device of claim 1, wherein:

said specific beam forming matrix is an n×n matrix that can be expressed as a product of two matrices, $P_L$ and $\tilde{V}$;

said matrix reconstruction unit is programmed to reconstruct matrix $\tilde{V}$ and matrix $P_L$ using said feedback information;

said matrix $\tilde{V}$ is an n×n matrix having $n^2$ complex elements, each complex element having a modulus and an angle, wherein $(n-1)^2$ of said moduli are included in said feedback information; and said matrix reconstruction unit is programmed to calculate the other moduli of matrix $\tilde{V}$ using the $(n-1)^2$ moduli in said feedback information, based on the unitary property of matrix $\tilde{V}$.

16. The wireless communication device of claim 15, wherein:

said matrix reconstruction unit is programmed to use numerical methods to calculate angles for most of the complex elements within matrix $\tilde{V}$.

17. The wireless communication device of claim 16, wherein:

said matrix reconstruction unit is programmed to calculate angles for complex elements within at least one column of matrix $\tilde{V}$ based on orthogonality between rows of matrix $\tilde{V}$.

18. The wireless communication device of claim 1, wherein:

said wireless communication device is for use in an SVD-MIMO system.

19. The wireless communication device of claim 1, wherein:

said wireless communication device is for use within a network using orthogonal frequency division multiplexing (OFDM);

said specific beam forming matrix is associated with one OFDM subcarrier within a plurality of subcarriers used in said network; and said feedback information includes no more than $n^2-n+1$ real variables and n−2 sign bits to describe at least one other beam forming matrix associated with at least one other OFDM subcarrier.

20. A wireless communication device comprising:
a channel matrix determination unit to determine a channel matrix H for a MIMO channel using data received from a remote wireless entity by multiple receive antennas;
a matrix decomposition unit to generate a beam forming matrix V using said channel matrix H;
a parameter extraction unit to extract parameters from said beam forming matrix V that describe said beam forming matrix V in a compact form and allow said beam forming matrix V to be reconstructed from said parameters; and
a transmitter to transmit said extracted parameters to said remote wireless entity as feedback;
wherein said parameter extraction unit is programmed to factor out phases from one row and one column of said beam forming matrix V to achieve a product of three matrices $P_L$, $\tilde{V}$, and $P_R$; and
wherein the beam forming matrix V has the form $$V = [\, v_1 \ v_2 \ \ldots \ v_n \,] = \left[ e^{i\theta_{j,k}} a_{j,k} \right]; \text{ and}$$

and
wherein $P_L$, $\tilde{V}$, $P_R$ have the form:

$$P_L = \begin{bmatrix} 1 & & & \\ & e^{i\theta_{2,1}} & & \\ & & \ddots & \\ & & & e^{i\theta_{n,1}} \end{bmatrix};$$

$$\tilde{V} = \begin{bmatrix} a_{1,1} & a_{1,2} & \ldots & a_{1,n-1} & \sqrt{1 - \sum_{j=1}^{n-1} a_{1,j}^2} \\ a_{2,1} & e^{i\varphi_{2,2}} a_{2,2} & \ldots & e^{i\varphi_{2,n-1}} a_{2,n-1} & e^{i\varphi_{2,n}} \sqrt{1 - \sum_{j=1}^{n-1} a_{j,n-1}^2} \\ \vdots & \vdots & \vdots & \vdots & \vdots \\ a_{n-1,1} & e^{i\varphi_{n-1,2}} a_{n-1,2} & \ldots & e^{i\varphi_{n-1,2}} a_{n-1,2} & e^{i\varphi_{n-1,n}} \sqrt{1 - \sum_{j=1}^{n-1} a_{n-1,j}^2} \\ \sqrt{1 - \sum_{j=1}^{n-1} a_{j,1}^2} & e^{i\varphi_{n,2}} \sqrt{1 - \sum_{j=1}^{n-1} a_{j,2}^2} & \ldots & e^{i\varphi_{n,n-1}} \sqrt{1 - \sum_{j=1}^{n-1} a_{j,n-1}^2} & e^{i\varphi_{n,n}} \sqrt{\sum_{j=1}^{n-1} \sum_{k=1}^{n-1} a_{j,k}^2 - n + 1} \end{bmatrix};$$

and $$P_R = \begin{bmatrix} e^{i\theta_{1,1}} & & & \\ & e^{i\theta_{1,2}} & & \\ & & \ddots & \\ & & & e^{i\theta_{1,n}} \end{bmatrix}.$$

21. The wireless communication device of claim 20, wherein:
said beam forming matrix V is a 4×4 matrix having 16 complex elements, each complex element having a modulus and an angle; and
said parameter extraction unit is programmed to extract 9 moduli, 1 angle, and two angle signs from said matrix $\tilde{V}$ for delivery to said remote wireless entity as feedback.

22. The wireless communication device of claim 21, wherein:
said parameter extraction unit is also programmed to extract three angles from matrix $P_L$ for delivery to said remote wireless entity as feedback.

23. The wireless communication device of claim 20, wherein:
said beam forming matrix V is an n×n matrix; and
said parameter extraction unit is programmed to extract $(n-1)^2$ parameters from said matrix $\tilde{V}$ for delivery to said remote wireless entity as feedback.

24. The wireless communication device of claim 23, wherein:
said parameter extraction unit is also programmed to extract (n−1) angles from said matrix $P_L$ for delivery to said remote wireless entity as feedback.

25. The wireless communication device of claim 20, wherein:
said wireless communication device is for use within a multicarrier communication system;
said channel matrix determination unit determines a channel matrix for each subcarrier of a plurality of subcarriers;
said decomposition unit is programmed to generate a beam forming matrix for each subcarrier of said plurality of subcarriers; and
said parameter extraction unit is to extract parameters from a beam forming matrix for each subcarrier of said plurality of subcarriers.

26. The wireless communication device of claim 20, wherein:
said decomposition unit is programmed to perform a singular value decomposition.

27. A method comprising:
receiving a compact representation of a beam forming matrix from a remote wireless entity;
reconstructing said beam forming matrix using said compact representation; and using said reconstructed beam forming matrix to process data symbols to be transmitted to the remote wireless entity via multiple transmit antennas;
wherein said beam forming matrix is an n×n matrix and said compact representation of said beam forming matrix includes no more than $n^2-n+1$ real variables and $n-2$ sign bits to describe said beam forming matrix.

28. The method of claim 27, wherein:
said beam forming matrix can be expressed as a product of two matrices, $P_L$ and $\tilde{V}$; and
reconstructing includes reconstructing both matrix $\tilde{V}$ and matrix $P_L$;
wherein said beam forming matrix is derived from an original beam forming matrix $$V = \begin{bmatrix} v_1 & v_2 & \ldots & v_n \end{bmatrix} = \lfloor e^{i\theta_{j,k}} a_{j,k} \rfloor$$

that is factored as follows:

$$V = P_L \tilde{V} P_R$$

where matrix $\tilde{V}$ and matrix $P_L$ have the form:

$$P_L = \begin{bmatrix} 1 & & & \\ & e^{i\theta_{2,1}} & & \\ & & \ddots & \\ & & & e^{i\theta_{n,1}} \end{bmatrix}, \text{ and}$$

$$\tilde{V} = \begin{bmatrix} a_{1,1} & a_{1,2} & \ldots & a_{1,n-1} & \sqrt{1-\sum_{j=1}^{n-1} a_{1,j}^2} \\ a_{2,1} & e^{i\varphi_{2,2}} a_{2,2} & \ldots & e^{i\varphi_{2,n-1}} a_{2,n-1} & e^{i\varphi_{2,n}} \sqrt{1-\sum_{j=1}^{n-1} a_{j,n-1}^2} \\ \vdots & \vdots & \vdots & \vdots & \vdots \\ a_{n-1,1} & e^{i\varphi_{n-1,2}} a_{n-1,2} & \ldots & e^{i\varphi_{n-1,2}} a_{n-1,2} & e^{i\varphi_{n-1,n}} \sqrt{1-\sum_{j=1}^{n-1} a_{n-1,j}^2} \\ \sqrt{1-\sum_{j=1}^{n-1} a_{j,1}^2} & e^{i\varphi_{n,2}} \sqrt{1-\sum_{j=1}^{n-1} a_{j,1}^2} & \ldots & e^{i\varphi_{n,n-1}} \sqrt{1-\sum_{j=1}^{n-1} a_{j,n-1}^2} & e^{i\varphi_{n,n}} \sqrt{\sum_{j=1}^{n-1}\sum_{k=1}^{n-1} a_{j,k}^2 - n + 1} \end{bmatrix}.$$

29. The method of claim 28, wherein:
said matrix $\tilde{V}$ is a 4×4 matrix having 16 complex elements, each complex element having a modulus and an angle, wherein 9 of said moduli are included in said compact representation; and
reconstructing includes calculating the other 7 moduli of matrix $\tilde{V}$ using the 9 moduli in said compact representation, based on the unit vector condition.

30. The method of claim 29, wherein:
reconstructing includes calculating angles for complex elements in a second column of matrix $\tilde{V}$ based on orthogonality between said second column and a first column of matrix $\tilde{V}$, wherein an angle associated with one complex element of said second column is included within said compact representation.

31. The method of claim 30, wherein:
calculating angles for complex elements in said second column includes using trigonometric relationships to calculate said angles.

32. The method of claim 30, wherein:
all complex elements within said first column of matrix $\tilde{V}$ have angles of zero.

33. The method of claim 30, wherein:
reconstructing includes calculating angles for complex elements in a third column of matrix $\tilde{V}$ based on orthogonality between said third column and said first and second columns, wherein calculating angles for complex elements in said third column includes using trigonometric relationships to calculate said angles.

34. The method of claim 33, wherein:
reconstructing includes calculating angle terms for complex elements in a fourth column of matrix $\tilde{V}$ based on orthogonality between rows within matrix $\tilde{V}$.

35. The method of claim 27, wherein:
said beam forming matrix is an n×n matrix that can be expressed as a product of two matrices, $P_L$ and $\tilde{V}$;
reconstructing includes reconstructing both matrix $\tilde{V}$ and matrix $P_L$;
said matrix $\tilde{V}$ is an n×n matrix having $n^2$ complex elements, each complex element having a modulus and an angle, wherein $(n-1)^2$ of said moduli are included in said compact representation; and
reconstructing includes calculating the other moduli of matrix $\tilde{V}$ using the $(n-1)^2$ moduli from said compact representation, based on a unitary property of matrix $\tilde{V}$.

36. The method of claim 35, further comprising:
receiving eigenvalue information from said remote wireless entity; and
using said eigenvalue information to perform adaptive bit loading.

37. The method of claim 35, wherein:
reconstructing includes using numerical methods to calculate angles for most of the complex elements within matrix $\tilde{V}$.

38. The method of claim 35, wherein:
reconstructing includes calculating angles for complex elements within at least one column of matrix $\tilde{V}$ based on orthogonality between rows of matrix $\tilde{V}$.

39. A method comprising:
determining a channel matrix for a wireless MIMO channel;
determining a beam forming matrix, to be used by a remote wireless entity, using said channel matrix;
extracting parameters from said beam forming matrix that describe said beam forming matrix in a compact form and that allow said beam forming matrix to be reconstructed; and
delivering said extracted parameters to said remote wireless entity as feedback information;

wherein said beam forming matrix is an n×n matrix and said extracted parameters include no more than $n^2-n+1$ real variables and n−2 sign bits to describe said beam forming matrix.

40. The method of claim 39, wherein:
determining a beam forming matrix includes performing a singular value decomposition (SVD) of the channel matrix.

41. The method of claim 39, wherein:
said beam forming matrix is a 4×4 matrix; and
extracting parameters includes extracting two sign bits, 9 real numbers between 0 and 1, and 4 angles between −π and +π.

42. The method of claim 39, wherein:
said beam forming matrix is a n×n matrix; and
extracting parameters includes extracting $n^2-2n+1$ real numbers between 0 and 1 and n−1 angles between −π and +π.

43. The method of claim 39, further comprising:
quantizing said extracted parameters before delivering said extracted parameters to said remote wireless entity.

44. The method of claim 39, wherein:
extracting parameters includes factoring out phases from one row and one column of said beam forming matrix to achieve a product of three matrices $P_L$, $\tilde{V}$, and $P_R$; wherein said beam forming matrix V has the form $$V = \begin{bmatrix} v_1 & v_2 & \ldots & v_n \end{bmatrix} = \lfloor e^{i\theta_{j,k}} a_{j,k} \rfloor; \text{ and}$$

and
wherein matrices $P_L$, $\tilde{V}$, and $P_R$ have the form:

$$P_L = \begin{bmatrix} 1 & & & \\ & e^{i\theta_{2,1}} & & \\ & & \ddots & \\ & & & e^{i\theta_{n,1}} \end{bmatrix};$$

$$P_R = \begin{bmatrix} e^{i\theta_{1,1}} & & & \\ & e^{i\theta_{1,2}} & & \\ & & \ddots & \\ & & & e^{i\theta_{1,n}} \end{bmatrix}.$$

45. The method of claim 44, wherein:
said beam forming matrix is a 4×4 matrix having 16 complex elements, each complex element having a modulus and an angle; and
extracting parameters includes extracting 9 moduli, 1 angle, and two angle signs from said matrix $\tilde{V}$ for delivery to said remote wireless entity as feedback.

46. The method of claim 45, wherein:
extracting parameters also includes extracting three angles from matrix $P_L$ for delivery to said remote wireless entity as feedback.

47. The method of claim 44, wherein:
said beam forming matrix is an n×n matrix; and
extracting parameters includes extracting $(n-1)^2$ parameters from said matrix $\tilde{V}$ for delivery to said remote wireless entity as feedback.

48. The method of claim 44, wherein:
extracting parameters also includes extracting (n−1) angles from matrix $P_L$ for delivery to said remote wireless entity as feedback.

49. An article comprising a computer readable storage medium having instructions stored thereon that, when executed by a computing platform, operate to:
receive a compact representation of a beam forming matrix from a remote wireless entity;
reconstruct said beam forming matrix using said compact representation; and
use said reconstructed beam forming matrix to process data symbols to be transmitted to the remote wireless entity via multiple transmit antennas;

$$\tilde{V} = \begin{bmatrix} a_{1,1} & a_{1,2} & \ldots & a_{1,n-1} & \sqrt{1-\sum_{j=1}^{n-1} a_{1,j}^2} \\ a_{2,1} & e^{i\varphi_{2,2}} a_{2,2} & \ldots & e^{i\varphi_{2,n-1}} a_{2,n-1} & e^{i\varphi_{2,n}} \sqrt{1-\sum_{j=1}^{n-1} a_{j,n-1}^2} \\ \vdots & \vdots & \vdots & \vdots & \vdots \\ a_{n-1,1} & e^{i\varphi_{n-1,2}} a_{n-1,2} & \ldots & e^{i\varphi_{n-1,2}} a_{n-1,2} & e^{i\varphi_{n-1,n}} \sqrt{1-\sum_{j=1}^{n-1} a_{n-1,j}^2} \\ \sqrt{1-\sum_{j=1}^{n-1} a_{j,1}^2} & e^{i\varphi_{n,2}} \sqrt{1-\sum_{j=1}^{n-1} a_{j,2}^2} & \ldots & e^{i\varphi_{n,n-1}} \sqrt{1-\sum_{j=1}^{n-1} a_{j,n-1}^2} & e^{i\varphi_{n,n}} \sqrt{\sum_{j=1}^{n-1}\sum_{k=1}^{n-1} a_{j,k}^2 - n + 1} \end{bmatrix};$$

and wherein said beam forming matrix is an n×n matrix and said compact representation of said beam forming matrix includes no more than $n^2-n+1$ real variables and $n-2$ sign bits to describe said beam forming matrix.

50. The article of claim 49, wherein:

said beam forming matrix is a 4×4 matrix that can be expressed as a product of two matrices, $P_L$ and $\tilde{V}$;

operation to reconstruct includes operation to reconstruct both matrix $\tilde{V}$ and matrix $P_L$;

said matrix $\tilde{V}$ is a 4×4 matrix having 16 complex elements, each complex element having a modulus and an angle, wherein 9 of said moduli are included in said compact representation; and operation to reconstruct includes operation to calculate the other 7 moduli of matrix $\tilde{V}$ using the 9 moduli in said compact representation, based on the unit vector condition;

wherein said beam forming matrix is derived from an original beam forming matrix $$V = \begin{bmatrix} v_1 & v_2 & \ldots & v_n \end{bmatrix} = \lfloor e^{i\theta_{j,k}} a_{j,k} \rfloor$$

that is factored as follows:

$$V = P_L \tilde{V} P_R$$

where matrix $P_L$ has the form:

$$P_L = \begin{bmatrix} 1 & & & \\ & e^{i\theta_{2,1}} & & \\ & & e^{i\theta_{3,1}} & \\ & & & e^{i\theta_{4,1}} \end{bmatrix}$$

and matrix $\tilde{V}$ has the form:

$$\tilde{V} = \begin{bmatrix} a_{1,1} & a_{1,2} & a_{1,3} & \sqrt{1-a_{1,1}^2-a_{1,2}^2-a_{1,3}^2} \\ a_{2,1} & e^{i\phi_{2,2}} a_{2,2} & e^{i\phi_{2,3}} a_{2,3} & e^{i\phi_{2,4}} \sqrt{1-a_{2,1}^2-a_{2,2}^2-a_{2,3}^2} \\ a_{3,1} & e^{i\phi_{3,2}} a_{3,2} & e^{i\phi_{3,3}} a_{3,3} & e^{i\phi_{3,4}} \sqrt{1-a_{3,1}^2-a_{3,2}^2-a_{2,3}^2} \\ \sqrt{1-a_{1,1}^2-a_{2,1}^2-a_{3,1}^2} & e^{i\phi_{4,2}}\sqrt{1-a_{1,2}^2-a_{2,2}^2-a_{3,2}^2} & e^{i\phi_{4,3}}\sqrt{1-a_{1,3}^2-a_{2,3}^2-a_{3,3}^2} & e^{i\phi_{4,4}}\sqrt{a_{4,1}^2-a_{4,2}^2-a_{4,3}^2} \end{bmatrix}.$$

51. The article of claim 49, wherein:

said beam forming matrix is an n×n matrix that can be expressed as a product of two matrices, $P_L$ and $\tilde{V}$;

operation to reconstruct includes operation to reconstruct both matrix $\tilde{V}$ and matrix $P_L$;

said matrix $\tilde{V}$ is an n×n matrix having $n^2$ complex elements, each complex element having a modulus and an angle, wherein $(n-1)^2$ of said moduli are included in said compact representation; and operation to reconstruct includes operation to calculate the other moduli of matrix $\tilde{V}$ using the $(n-1)^2$ moduli from said compact representation, based on the unitary property of matrix $\tilde{V}$;

wherein said beam forming matrix is derived from an original beam forming matrix $$V = \begin{bmatrix} v_1 & v_2 & \ldots & v_n \end{bmatrix} = \lfloor e^{i\theta_{j,k}} a_{j,k} \rfloor$$

that is factored as follows:

$$V = P_L \tilde{V} P_R$$

where matrix $P_L$ has the form:

$$P_L = \begin{bmatrix} 1 & & & \\ & e^{i\theta_{2,1}} & & \\ & & \ddots & \\ & & & e^{i\theta_{n,1}} \end{bmatrix}$$

and matrix $\tilde{V}$ has the form:

$$\tilde{V} = \begin{bmatrix} a_{1,1} & a_{1,2} & \ldots & a_{1,n-1} & \sqrt{1-\sum_{j=1}^{n-1} a_{1,j}^2} \\ a_{2,1} & e^{i\varphi_{2,2}} a_{2,2} & \ldots & e^{i\varphi_{2,n-1}} a_{2,n-1} & e^{i\varphi_{2,n}}\sqrt{1-\sum_{j=1}^{n-1} a_{2,j-1}^2} \\ \vdots & \vdots & \vdots & \vdots & \vdots \\ a_{n-1,1} & e^{i\varphi_{n-1,2}} a_{n-1,2} & \ldots & e^{i\varphi_{n-1,2}} a_{n-1,2} & e^{i\varphi_{n-1,n}}\sqrt{1-\sum_{j=1}^{n-1} a_{n-1,j}^2} \\ \sqrt{1-\sum_{j=1}^{n-1} a_{j,1}^2} & e^{i\varphi_{n,2}}\sqrt{1-\sum_{j=1}^{n-1} a_{j,1}^2} & \ldots & e^{i\varphi_{n,n-1}}\sqrt{1-\sum_{j=1}^{n-1} a_{j,n-1}^2} & e^{i\varphi_{n,n}}\sqrt{\sum_{j=1}^{n-1}\sum_{k=1}^{n-1} a_{j,k}^2 - n+1} \end{bmatrix}.$$

52. A wireless communication device comprising:

multiple dipole transmit antennas;

a matrix multiplier to multiply a data symbol vector by a beam forming matrix before said data symbol vector is transmitted to a remote wireless entity via said multiple dipole transmit antennas;

a receiver to receive feedback information from the remote wireless entity, said feedback information describing, in a compact form, a specific beam forming matrix to be used in a future data transmission to said remote wireless entity; and a matrix reconstruction unit to reconstruct said specific beam forming matrix using said feedback information, said reconstructed beam forming matrix for delivery to said matrix multiplier;

wherein said specific beam forming matrix is an n×n matrix and said feedback information includes no more than $n^2-n+1$ real variables and $n-2$ sign bits to describe said specific beam forming matrix.

53. The wireless communication device of claim 52, wherein:

said specific beam forming matrix is a 4×4 matrix; and said feedback information includes no more than 13 real variables and 2 sign bits to describe said specific beam forming matrix.

54. The wireless communication device of claim 52, wherein:

said specific beam forming matrix is a 4×4 matrix; and said feedback information consists of two sign bits, 9 real numbers between 0 and 1, and 4 angles between $-\pi$ and $+\pi$ to describe said specific beam forming matrix.

55. The wireless communication device of claim 52, wherein:

said specific beam forming matrix is an n×n matrix; and said feedback information includes no more than $n^2-n$ parameters to describe said specific beam forming matrix.

56. The wireless communication device of claim 52, wherein:

said specific beam forming matrix is an n×n matrix; and said feedback information consists of $n^2-2n+1$ real numbers between 0 and 1 and $n-1$ angles between $-\pi$ and $+\pi$ to describe said specific beam forming matrix.

* * * * *